United States Patent

Wright et al.

[11] 3,800,905
[45] Apr. 2, 1974

[54] FLEXIBLE INFLATED PUFF-PORT SYSTEM

[75] Inventors: Raymond Grenville Whitehead Wright; Anthony Yelverton Simpson, both of New Orleans, La.

[73] Assignee: Textron Inc., Providence, R.I.

[22] Filed: May 25, 1972

[21] Appl. No.: 257,015

[52] U.S. Cl. ............................................... 180/117
[51] Int. Cl. ................................................ B60v 1/00
[58] Field of Search ............................ 180/116–130

[56] References Cited
UNITED STATES PATENTS

| | | | |
|---|---|---|---|
| 3,198,274 | 8/1965 | Cocksedge | 180/120 |
| 3,208,543 | 9/1965 | Crowley | 180/120 |
| 3,118,513 | 1/1964 | Cockerell | 180/120 |
| 3,181,636 | 5/1964 | Cockerell | 180/118 |
| 3,465,844 | 9/1969 | Page et al. | 180/118 |
| 3,246,426 | 4/1966 | Sawyer | 180/120 |

Primary Examiner—David Schonberg
Assistant Examiner—J. D. Rubenstein
Attorney, Agent, or Firm—Bean & Bean

[57] ABSTRACT

An improved "puff-port" device and control system for an air cushion vehicle, energizing for a prescribed maneuver either one of a pair of oppositely directed puff-port reaction nozzles (carried by the vehicle) by selectively bypassing thereto some of the vehicle cushion feed air from the normal supply to the air cushion seal system at one side of the vehicle, so as to induce a vehicle roll effect causing a differential of cushion air escape thrust reaction forces at opposite sides of the vehicle, resulting in a complement to the effectiveness of the puff-port reaction forces. The system provides improved maneuvering control for turning and/or displacing the vehicle in any desired maneuver; and in any case (whether operative or not) the puff-port devices are also adapted to function as pneumatic shock absorbers, protecting the vehicle hard structure against damage such as when docking the vehicle.

11 Claims, 9 Drawing Figures

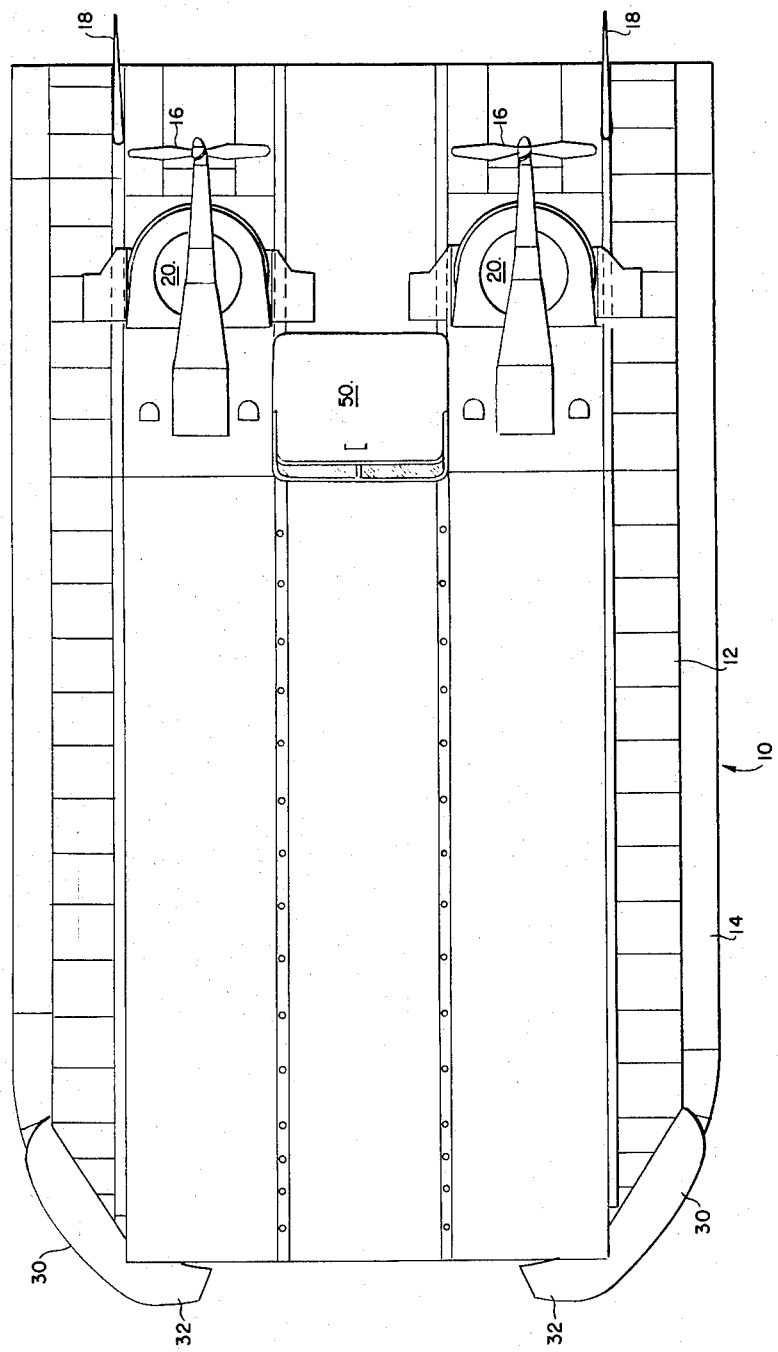

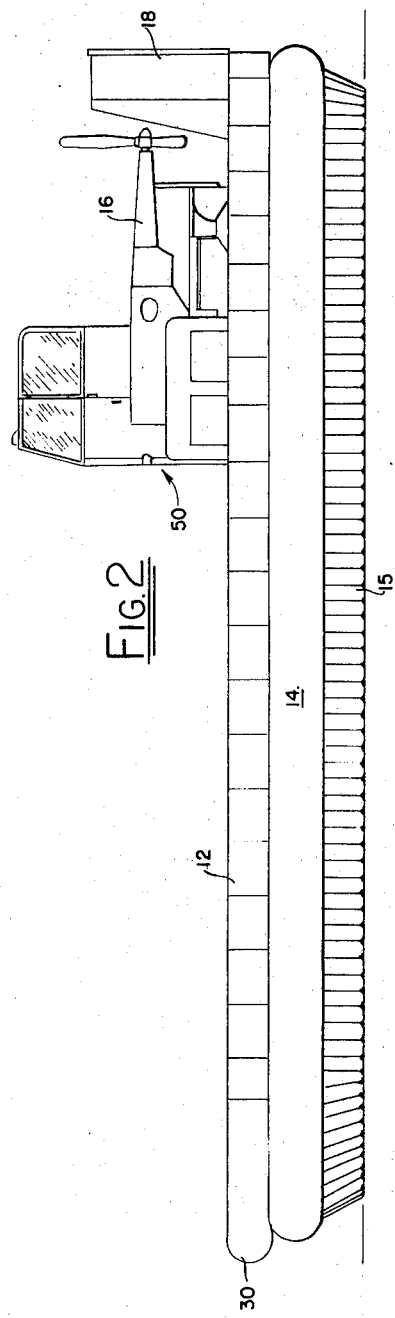
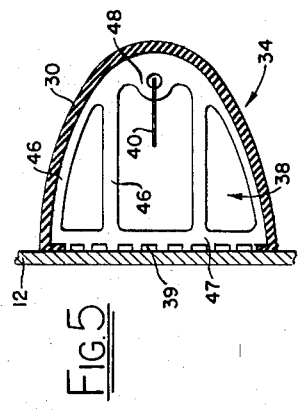
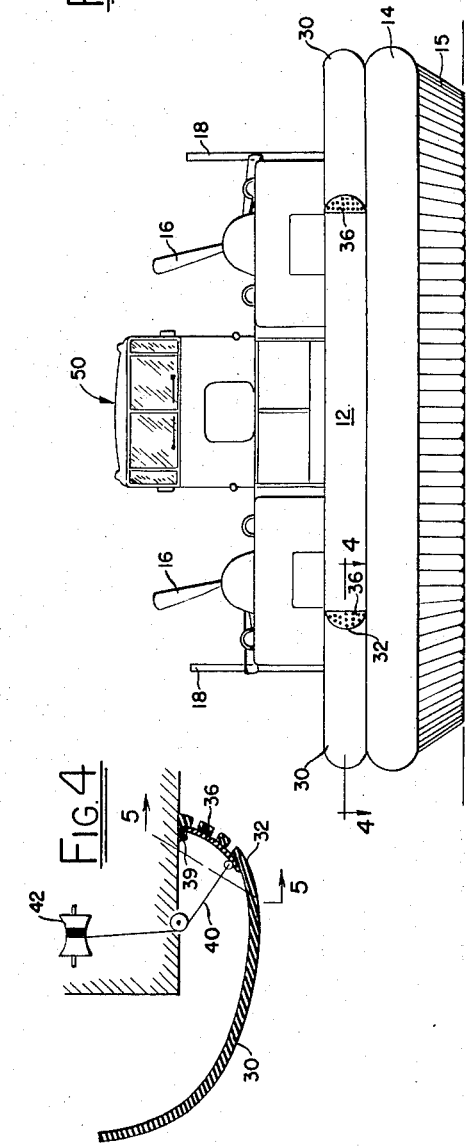
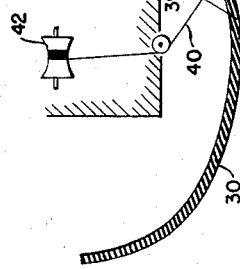

THIS INVENTION

FLEXIBLE INFLATED PUFF-PORT SYSTEM

BACKGROUND AND OBJECTS OF THE INVENTION

The invention has particular application to vehicles of the so-called surface effect type; that is to vehicles for travelling over any surface and which when in operation are supported above the surface (at least in part) by a cushion of pressurized gas such as air. In some such vehicles, for example those in which the vehicle-supporting cushion is wholly contained by a flexible wall or skirt-seal depending from the vehicle body, a problem exists with respect to lateral control of the vehicle, particularly at low speeds. This is because there is little or no frictional contact between the vehicle skirt or seal and the surface over which the vehicle travels. It has been previously proposed to solve this problem by discharging controlled flows of gas (air) sidewise from either side of the vehicle body, so as to apply to the vehicle (by reaction) turning or pushing moments. Such devices have heretofore been referred to as "thrusters" or "puff-port" controls.

The present invention provides an improved "puff-port" system whereby to avoid certain very disadvantageous operational propensities of the prior arrangements; notably the tendency of prior vehicles to "roll" away from the direction of a turning or side-slip maneuver, whereby the increased air escape from beneath the perimetrically leading section of the vehicle air cushion seal operates to oppose accomplishment of the desired maneuver. An example of such prior art is disclosed in U.S. Pat. No. 3,465,844.

It is one object of the present invention to provide in an air cushion vehicle or the like an improved "puff-port" system, which upon operation causes the vehicle to roll into the turn or side-slip maneuver which is simultaneously initiated by operation of the puff-port system. Hence, a short term increase of air escape from beneath the vehicle skirt (air cushion seal) at the opposite side of the vehicle is experienced, and operates to augment the desired displacement/directional control effect. Thus, the system is equally applicable to sidewise slip maneuvers, as well as to turning maneuvers.

THE DRAWING

Exemplary embodiments of the invention are illustrated by the accompanying drawing, wherein:

FIG. 1 is a plan view of one form of surface effect vehicle embodying the present invention;

FIG. 2 is a side elevational view thereof;

FIG. 3 is a front end elevational view thereof;

FIG. 4 is a fragmentary, somewhat schematic, sectional view taken as suggested by line 4—4 of FIG. 3;

FIG. 5 is a sectional view on enlarged scale taken as suggested by line 5—5 of FIG. 4;

Figure 6:
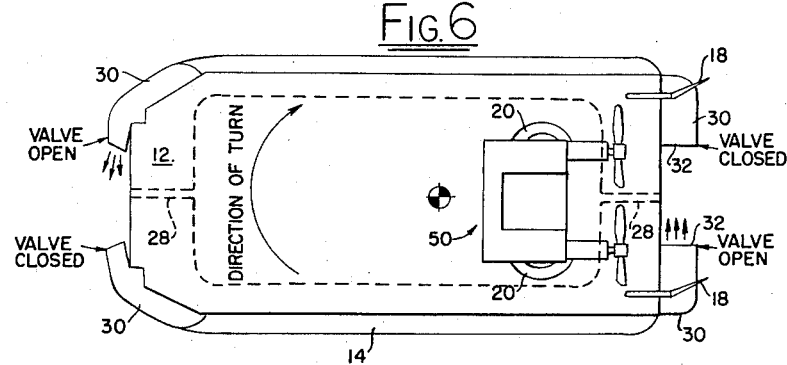
FIG. 6 is a schematic plan view thereof, illustrating the control system operating in a directional turning mode.
Figure 7:
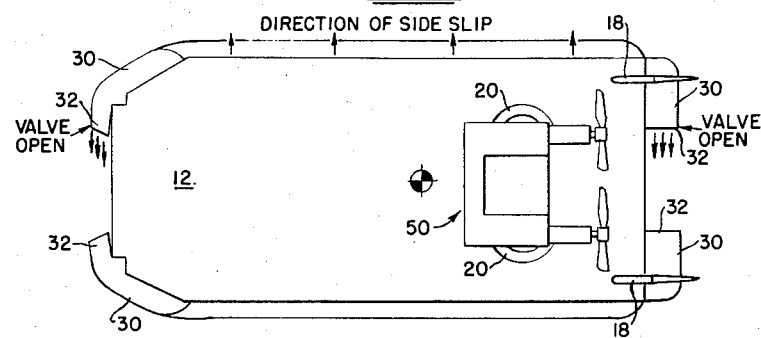
Figure 8:
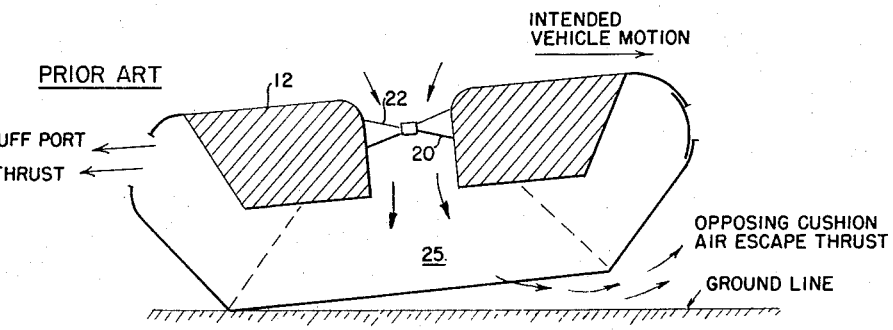
Figure 9:
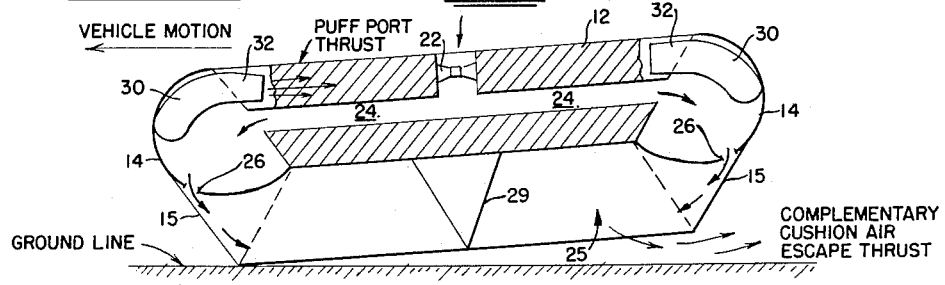

FIG. 7 corresponds to FIG. 6 but shows the control system when operative in a side-slip maneuver;

FIG. 8 is a diagrammatic cross-sectional view showing a prior type puff-port equipped vehicle when involved in an attempted turning or side-slip maneuver; and FIG. 9 is a view corresponding to FIG. 8 but illustrates a vehicle of the present invention when involved in a directional turning or side-slip maneuver.

SPECIFICATION

By way of example, the drawings herewith illustrate a surface effect vehicle which is designated generally at 10, supported above a reaction surface by a cushion of pressurized air formed beneath the vehicle body 12 and contained thereunder by a seal system comprising an inflated flexible bag 14 and a finger-seal system 15 attached to and depending therebelow. It is to be understood however that any other preferred form of cushion air seal system may be employed.

The vehicle 10 is shown as being propelled by airscrew propulsion units 16—16 and may be directionally controlled (basically) by twin rudder units 18-18 and/or differential controlling of the propeller thrusts; supplemented by operations of the puff-port devices of the present invention as will be explained hereinafter. The air support cushion is formed by drawing in air from the atmosphere through intake ports 20—20 as by means of fans 22 (FIGS. 7–8) driven by variable-speed engines and discharging air to the interior of the flexible bag arrangement. Thus, as shown at FIG. 9 the air delivery into the air cushion cavity 25 may be by way of conduits 24—24 and through apertures 26 formed in the bag 14. The air then flows through the fingers 15 into the air cushion cavity 25. Note that the bag 14 is preferably divided into oppositely paired sections perimetrically of the vehicle, as by partitions 28 (FIG. 6). Also, the air cushion cavity space 25 may preferably be longitudinally divided as shown by a partition device 29 (FIG. 9) to substantially limit loss of support pressure to that side of the cushion cavity from which puff-port air is being drawn, thereby improving the desired control effects.

In accordance with the present invention when the operator of the vehicle desires to turn the vehicle in a given direction, he is provided with means for momentarily and selectively diverting portions of the cushion cavity air supply away from a prescribed perimetrical section of the air cushion so as to momentarily lower the support pressure at that bow/side/stern section of the vehicle; thus causing the vehicle to roll over toward that section of its perimeter. The diverted supply air is simultaneously delivered by a puff-port nozzle(s) to discharge horizontally against the ambient atmosphere so as to push (by reaction) that portion of the craft laterally in the aforesaid desired direction. The roll effect so induced permits an increased rate of escape of air from the cushion cavity beneath the seal along the opposite side of the vehicle (FIG. 9); while at the same time the lowering of the seal along the leading section of the vehicle results in a reduction of the rate of escape of cushion air from beneath that perimetrical portion of the seal system. Hence the roll-induced differential of rate of cushion air escape from beneath opposite side portions of the vehicle operates to augment the side thrust effect of the puff-port operation.

By way of further explanation and as illustrated herein as a preferred example in order to obtain maximum turn effects, the puff-port devices may be constructed to comprise flexible conduits 30 arranged to extend outwardly from and to wrap around the four corner portions of the vehicle body so-called "hard structure" 12. The conduits may be constructed of any suitable air-tight flexible fabric and are arranged in oppositely paired relation in intake communication with the bag portion of the air cushion seal system at their respective sides of the vehicle. Also, the conduits are preferably constructed to terminate in slightly constricted nozzle portions 32; the nozzles 32 of each pair of conduits being oppositely directed as best shown in FIGS. 1, 3, 6, 7, 9. The nozzles 32 are controlled in their operation by any suitable valve means such as are indicated generally at 34—34 (FIGS. 4, 5).

As shown by way of better detail at FIGS. 3, 4, the discharge end portion of each conduit 30 may for example be provided in the form of an apertured flexible sheet portion 36 through which (when otherwise unopposed) air may flow to provide the desired reaction thrust effects referred to hereinabove. In this case the valve plate device may comprise a flexible air-tight sheet of material (such as rubber or rubberized fabric) as illustrated at 38, affixed along one edge thereof as indicated at 39 to the vehicle structure as in the manner of a hinge connection. A pull cord 40 is attached to the valve plate 38 and is arranged to wind upon a windlass 42 which operates under control of the vehicle operator to pull the valve plate 38 away from the apertured sheet 36. Thus, the valve device may be "opened" to permit escape of air through the conduit and thrust nozzle system while at the same time diminishing the air supply within the associated section of the vehicle bag-seal system, as explained hereinabove.

FIG. 5 illustrates how the valve plate 38 may be constructed to include shape-preserving rubber moldings or the like at 46–47–48, so as to give the valve plate suitable operational integrity while leaving it sufficiently flexible as to avoid being damaged when crushed, such as whenever the conduit system acts as a pneumatic bumper during a vehicle docking maneuver. It is to be understood that any other suitable form of valve device for the nozzles 32 may be employed in lieu of the type shown herein; and that the conduits 30 (when under valve-closed conditions) are pneumatically inflated to the same degree as their associated bag devices, and therefore normally project from the "hard structure" of the vehicle as shown in the drawing so as to be adapted to act as pneumatic bumpers.

FIGS. 6, 7, illustrate that the "puff-port" conduit-nozzle devices may be disposed both at the bow and stern corner portions of the vehicle so as to attain shorter radius turn capability as well as "four-corner" pneumatic bumper effects. It is to be understood that the puff-port nozzles may also be located at any other preferred positions along the sides and ends of the vehicle; and also that the valves controlling the nozzles, as well as the rudder and propulsion engine/propeller and cushion air supply systems, may all be conveniently centralized at a single control panel located at a vehicle operator station such as illustrated at 50. The operational control facilities for these purposes may of course be of any suitable types as are well known, and which therefore require no further illustration or explantion herein. Furthermore, the invention contemplates that the rudder, engine/propeller and puff-port nozzle control systems may be arranged so as to be pilot-operated either individually, or so integrated as to automatically operate simultaneously, as may be preferred.

We claim:

1. An air cushion vehicle comprising a body, an air cushion seal means extending at least partially perimetrally of the air cushion cavity under said body at opposite sides thereof for laterally containing, at least in part, the vehicle-supporting air cushion, said seal means being attached to the body of the vehicle and extending downwardly therefrom, the interiors of said seal means being in direct air-flow communication with the air cushion at opposite sides thereof, means supplying pressurized air to separate side sections of said seal means, a pair of puff-port jet reaction nozzles arranged to discharge in opposite directions, and vehicle operator selectively controllable conduit means arranged to provide for concomitant directional control and compatible roll control of the vehicle by momentarily diverting a portion of the pressurized air supply for a selected one of said seal side sections so as to cause the vehicle to lean toward a lateral direction and delivery of the diverted portion of air supply to atmosphere through the jet nozzle which is arranged to discharge so as to reaction-thrust the vehicle in said lateral direction.

2. An air cushion vehicle as set forth in claim 1, wherein said seal means comprises separately inflatable bags located at opposite sides of said vehicle, said bags being apertured to deliver air into said cavity.

3. An air cushion vehicle as set forth in claim 2, wherein said air cushion cavity is divided by a partition device extending longitudinally thereof.

4. An air cushion vehicle as set forth in claim 1, wherein said jet nozzles are located at the bow corners of the vehicle.

5. An air cushion vehicle as set forth in claim 1, wherein said jet nozzles are located adjacent the four corner portions of the vehicle.

6. An air cushion vehicle as set forth in claim 1, wherein said conduit means are formed of flexible material inflatable to extend outwardly of the perimeter of the vehicle body, being thereby adapted to function as pneumatic bumper means.

7. An air cushion vehicle as set forth in claim 6, wherein said conduit means are disposed to wrap around corner portions of the vehicle body.

8. An air cushion vehicle as set forth in claim 7, wherein said conduit means each terminates in a reduced cross section area nozzle portion.

9. An air cushion vehicle as set forth in claim 6 wherein said conduit means includes remotely controllable valve means.

10. An air cushion vehicle as set forth in claim 9, wherein said valve means are flexible and readily deformable concomitant with said conduit means.

11. An air cushion vehicle as set forth in claim 10, wherein said valve means are shape-resilient.

* * * * *